(12) United States Patent
Xu

(10) Patent No.: US 10,929,332 B2
(45) Date of Patent: Feb. 23, 2021

(54) USB TRANSMISSION DEVICE AND TRANSMISSION METHOD

(71) Applicant: MONTAGE LZ TECHNOLOGIES (CHENGDU) CO., LTD., Chengdu (CN)

(72) Inventor: Zeng Xu, Chengdu (CN)

(73) Assignee: MONTAGE LZ TECHNOLOGIES (Chengdu) Co., Ltd., Chendgu (CN)

( * ) Notice: Subject to any disclaimer, the term of this patent is extended or adjusted under 35 U.S.C. 154(b) by 0 days.

(21) Appl. No.: 16/601,949

(22) Filed: Oct. 15, 2019

(65) Prior Publication Data
US 2020/0183875 A1 Jun. 11, 2020

(30) Foreign Application Priority Data
Dec. 10, 2018 (CN) .......................... 201811502238.9

(51) Int. Cl.
*G06F 13/42* (2006.01)
*G06F 13/28* (2006.01)
*G06F 13/16* (2006.01)

(52) U.S. Cl.
CPC ...... *G06F 13/4282* (2013.01); *G06F 13/1668* (2013.01); *G06F 13/28* (2013.01)

(58) Field of Classification Search
CPC combination set(s) only.
See application file for complete search history.

(56) References Cited

U.S. PATENT DOCUMENTS

| 7,035,355 | B2 | 4/2006 | Lais et al. |
| 7,035,948 | B1 * | 4/2006 | Liang ...................... G06F 13/28 710/310 |
| 7,093,277 | B2 * | 8/2006 | Perlman .............. H04L 63/0428 348/E5.002 |
| 7,336,675 | B2 * | 2/2008 | Naik ................... H04L 47/6295 370/412 |
| 7,450,571 | B2 | 11/2008 | Zhang et al. |
| 7,602,723 | B2 | 10/2009 | Mandato et al. |
| 7,995,652 | B2 | 8/2011 | Washington |

* cited by examiner

*Primary Examiner* — Henry Tsai
*Assistant Examiner* — Juanito Borromeo
(74) *Attorney, Agent, or Firm* — Oliff PLC

(57) ABSTRACT

The present application relates to the field of integrated circuit design and manufacturing, and discloses a USB transmission device and a transmission method, which may greatly improve the transmission rate when transmitting a large number of small files. The device includes: a configuration module, configured to configure a first transfer ring corresponding to a first transfer thread and a second transfer ring corresponding to a second transfer thread for one endpoint in a memory; a USB host controller, configured to directly perform a transmission of the second transfer thread according to the configured second transfer ring when a transmission of the first transfer thread ends.

14 Claims, 2 Drawing Sheets

USB TRANSMISSION DEVICE AND TRANSMISSION METHOD

TECHNICAL FIELD

The application relates to the field of integrated circuit design and manufacturing, and more particularly to integrated circuit technology including a USB host controller.

BACKGROUND OF THE INVENTION

USB (Universal Serial Bus) is an external bus standard that regulates the connection and communication between a computer and an external device. USB technology has been widely used and has been developed to the 3.X version.

One conventional application of USB is to transfer files, the inventors of the present application have found that a transmission rate of USB when transferring large files is much higher than that of transferring multiple small files which have the same amount of data with the large files. However, in many application scenarios, a large number of small files are needed to be transmitted. Therefore, how to improve the USB technology to increase the transmission rate of a large number of small files is an important issue that needs to be solved.

In addition, USB3.x defines the concept of a pipe. The pipe is the data channel between application software (hereinafter also referred to as "software") and device. Since it is not only software that can initiate data transmission, it is easy to cause confusions of priority levels between pipes. After the transmission is interrupted unexpectedly, the data pointer of the current transmission may be lost, resulting in redundant transmission when the breakpoint is resumed.

BRIEF DESCRIPTION OF THE INVENTION

The purpose of the application is to provide a USB transmission device and a transmission method, which can significantly improve the transmission rate when a large number of small files are transmitted by USB.

In order to solve the above problems, the present application discloses a USB transmission device, comprising:

a configuration module, configured to configure a first transfer ring corresponding to a first transfer thread and a second transfer ring corresponding to a second transfer thread for one endpoint in memory; and a USB host controller, configured to directly perform a transmission of the second transfer thread according to the configured second transfer ring when a transmission of the first transfer thread ends.

In a preferred embodiment, initial dequeue pointers of the first and second transfer rings are included in a configure endpoint command;

the initial dequeue pointers of the first and second transfer rings in the configure endpoint command are copied into USB device context when the host controller executes the configure endpoint command.

In a preferred embodiment, the device further comprises:

a software request buffer, configured to store pipe identifiers of transfer requests initiated by software;

a periodic request buffer, configured to store pipe identifiers of periodic transfer requests;

a saved request buffer, configured to store pipe identifiers of transfer requests interrupted by missing a current service opportunity and waiting for a next service opportunity to resume;

a not-ready request buffer, configured to store pipe identifiers of transfer requests interrupted due to a not-ready handshake signal returned from a USB device;

an arbiter, configured to arbitrate in transfers and select a transfer request from transfer requests in the software request buffer, the periodic request buffer, the saved request buffer, and the not-ready request buffer for transmission; and a transfer management module, configured to manage a data transmission process of the transfer request selected by the arbiter.

In a preferred embodiment, the device further comprises:

a pipe information buffer, for buffering information about transfer requests corresponding to N pipes, wherein N is a positive integer;

a pipe information load module, configured to load information of a selected transfer request from the pipe information buffer with respect to a transfer request selected by the arbiter.

In a preferred embodiment, the device further comprises:

the software request buffer, the periodic request buffer, the saved request buffer, and the not-ready request buffer respectively include N registers each of which corresponding to one transfer request in the pipe information buffer.

In a preferred embodiment, further comprising a pipe information module;

wherein the transfer management module is further configured to: transmit various state information of a current pipe to the pipe information module during the transmission process or after the end of the transmission, wherein the pipe information module determines whether to write the pipe information back to the pipe information buffer according to the current transmission state.

In a preferred embodiment, the device further comprises:

a periodic transfer management module, configured to manage synchronization and interruption of two periodic transmissions; wherein the periodic transfer management module stores a request initiated by the software and periodically initiating a transfer request according to characteristics of the endpoint after the software requests a periodic transmission from the endpoint.

The application also discloses a USB transmission method, including:

configuring a first transfer ring corresponding to a first transfer thread and a second transfer ring corresponding to a second transfer thread for one endpoint in an internal memory; and directly performing a transmission of the second transfer thread according to the already configured second transfer ring directly by a USB host controller, when a transmission of the first transfer thread ends.

In a preferred embodiment, the method further comprises:

copying the initial dequeue pointers of the first and second transfer rings in the configure endpoint command into USB device context when the host controller executes the configure endpoint command;

wherein the initial dequeue pointers of the first and second transfer ring are included in a configure endpoint command.

In a preferred embodiment, the method further comprises:

setting the transfer loop dequeue pointer of the first transfer thread or the second transfer thread selectively when the host controller executes a set TR dequeue pointer command.

In a preferred embodiment, the method further comprises:

stopping simultaneously all threads which the endpoint is executing; and storing the transfer loop dequeue pointers of all currently executing threads when the host controller executes a set stop endpoint command.

In a preferred embodiment, the method further comprises:

resuming execution of all threads that are currently stopped when the host controller executes a transfer command.

In a preferred embodiment, the method further comprises:

stopping all threads of the endpoint when the endpoint has a transmission error and needs to be stopped.

In a preferred embodiment, the method further comprises:

storing a pipe identifier of a transfer request into a periodic request buffer if the transfer request initiated by a software is periodic, otherwise into a software request buffer;

storing the pipe identifier of the transfer request into a saved request buffer if the transfer request has been interrupted by missing a current service opportunity and needs to wait for a next service opportunity to resume;

storing the pipe identifier of the transfer request into a not-ready request buffer, if the transfer request is interrupted due to a not-ready handshake signal returned from a USB device;

selecting a transfer request for transmission from the software request buffer, the periodic request buffer, the saved request buffer, or the not-ready request buffer.

In a preferred embodiment, after the step of selecting a transfer request, the method comprises:

loading the information for the selected transfer request from a pipe information buffer for the selected transfer request;

determining whether to write the pipe information back to the pipe information buffer according to the current transmission status during the transmission or after end of the transmission;

wherein the pipe information buffer is configured to buffer information about transfer requests corresponding to the N pipes, wherein N is a positive integer.

The present application also discloses a computer readable storage medium having computer executable commands stored therein, wherein the computer executable commands are executed by a processor to implement the steps in the method hereinbefore described.

In above embodiments of the present application, multi-thread transmission is introduced for the same endpoint of a USB device, which eliminates time waiting for software to configure the transfer rings during the transmission process, and improves transmission efficiency, especially when transmitting a large number of small files.

In addition, the present application implements management of the USB pipes through above method of classification management, and can conveniently control transmission priority and accurately locate resuming location of breakpoint. It solves the problem of confusions of priority levels between pipes, and the problem of redundant transmission occurred during resuming transmission at the breakpoint which is caused by losing data pointer of the current transmission after the accidental interruption of the transmission.

A large number of technical features are described in the specification of the present application, and are distributed in various technical solutions. If a combination (i.e., a technical solution) of all possible technical features of the present application is listed, the description may be made too long. In order to avoid this problem, the various technical features disclosed in the above summary of the present application, the technical features disclosed in the various embodiments and examples below, and the various technical features disclosed in the drawings can be freely combined with each other to constitute Various new technical solutions (all of which are considered to have been described in this specification), unless a combination of such technical features is not technically feasible. For example, feature A+B+C is disclosed in one example, and feature A+B+D+E is disclosed in another example, while features C and D are equivalent technical means that perform the same function, and technically only choose one, not to adopt at the same time. Feature E can be combined with feature C technically. Then, the A+B+C+D scheme should not be regarded as already recorded because of the technical infeasibility, and A+B+C+E scheme should be considered as already documented.

DETAILED DESCRIPTION OF THE ILLUSTRATED EMBODIMENTS

Figure 1:
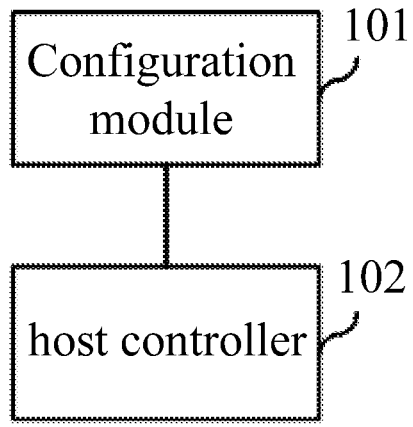
FIG. 1 is a block diagram of a USB transmission device according to a first embodiment of the present application.

In the following description, numerous technical details are set forth in order to provide the reader with a better understanding of the present application. However, those skilled in the art can understand that the technical solutions claimed in the present application can be implemented without these technical details and various changes and modifications based on the following embodiments.

Description of Some Concepts:
USB, Universal Serial Bus,
TRB: Transfer Request Block,
TR: Transfer Ring,
XHCI: eXtensible Host Controller Interface,
SoC: System-on-a-chip
DMA: Direct Memory Access.

The following is a summary of some of the innovations of this application:

At present, USB3.X protocol transmits slowly when transferring a large number of small files, which is much lower than transmission rate of large files of the same total data amount. However, file transfer is generally initiated by application software. From application layer to physical layer, there are many reasons for the slower transmission rate of small files, such as application-level reasons, operating system level reasons, driver software reasons, USB level reasons and so on. And these reasons are just a rough category of reasons, and there are many specific factors in each category that may cause small files transferring slower.

Among the numerous reasons, inventors of the present invention have creatively discovered that if at least two transfer threads can be configured for an endpoint (currently an endpoint in USB protocol supports only one transfer thread when transmitting), and transfer rings are configured respectively for these transfer threads in memory, when a transmission of one transfer thread ends, by directly switching to another transfer thread that has already configured a transfer ring for transmission, the transmission rate of a large number of small files can be greatly increased. During process of USB transmission, execution of each transfer request requires multiple DMA requests. For small data transmission, most of the DMA requests are to obtain information of the USB device which is repeatedly obtained for each transmission and will be released once a transmission is completed, which will waste a lot of bandwidth. If using multi-line thread transmission, after getting the information of the USB device once, the small data is put in different threads and transmission is switched between the threads, software can prepare data for another thread while one thread is transmitting, which saves time for DMA request to obtain the information of the USB device, thus improving the transmission efficiency.

In addition, the present application divides USB pipes into at least four categories: software requests, periodic requests, saved requests, and not-ready requests. Through this classification management of USB pipes, it is easy to control the transmission priority and accurately locate resuming location of breakpoint, further improving the performance of USB transmission.

In order to make the objects, technical solutions and advantages of the present application clearer, embodiments of the present application will be further described in detail below with reference to the accompanying drawings.

The first embodiment of the present application relates to a USB transmission device of which basic structure is as shown in FIG. 1, and the device includes:

a configuration module 101, configured to configure a first transfer ring corresponding to a first transfer thread and a second transfer ring corresponding to a second transfer thread for one endpoint in memory, that is, configuring at least two transfer threads and their corresponding transfer rings for the same endpoint. In embodiments in which more than two transfer threads are configured, any two of the transfer threads can be the first transfer thread and the second transfer thread;

a USB host controller 102, configured to directly perform a transmission of the second transfer thread according to the already configured second transfer ring when a transmission of the first transfer thread ends.

In one embodiment, configure endpoint command of the existing USB protocol is modified such that the configure endpoint command includes initial dequeue pointers of the first transfer ring and second transfer ring; when the host controller executes the configure endpoint command, the initial dequeue pointers of the first transfer ring and second transfer ring in the configure endpoint command are copied into the USB device context.

In an embodiment, the USB transmission device further includes:

a software request buffer, configured to store pipe identifiers of transfer requests initiated by software;

a periodic request buffer, configured to store pipe identifiers of periodic transfer requests;

a saved request buffer, configured to store pipe identifiers of transfer requests interrupted by missing a current service opportunity and waiting for a next service opportunity to resume;

a not-ready request buffer, configured to store pipe identifiers of transfer requests interrupted due to a not-ready handshake signal returned from a USB device;

an arbiter, configured to arbitrate in transfers and select a transfer request from transfer requests in the software request buffer, the periodic request buffer, the saved request buffer, and the not-ready request buffer for transmission; and a transfer management module, configured to manage a data transmission process of the transfer request selected by the arbiter.

a pipe information buffer, configured to buffer information about transfer requests corresponding to N pipes, where N is a positive integer;

a pipe information load module, configured to load information of the selected transfer request from the pipe information buffer with respect to the transfer request selected by the arbiter.

The transfer management module is further configured to transmit various state information of the current pipe to the pipe information module during the transmission process or after the end of the transmission, and the pipe information module is configured to determine whether to write the pipe information back to the pipe information buffer according to the current transmission state.

The periodic transfer management module is configured to manage synchronization and interruption of two periodic transmissions, the periodic transfer management module stores a request initiated by the software and periodically initiating a transfer request according to characteristics of the endpoint after the software requests a periodic transmission from the endpoint.

In one embodiment, the software request buffer, the periodic request buffer, the saved request buffer, and the not-ready request buffer respectively include N registers, each register corresponding to a pipe in the pipe information buffer. Each register has an address, such as 1, 2, 3, . . . . The register address is used as a pipe identifier which is used to implement corresponding relation between the register to a pipe address in the pipe information buffer, that is, this register address is also configured to read the information of the corresponding pipe from the pipe information buffer. For example, when the register with address 3 of the periodic request buffer is set to 1, the address 3 is the pipe identifier, indicating that the pipe identified as the address 3 is a periodic request. For example, if the register with address 3 in the saved request buffer is set to 0, it indicates that the pipe identified as 3 is not a saved request.

Figure 2:
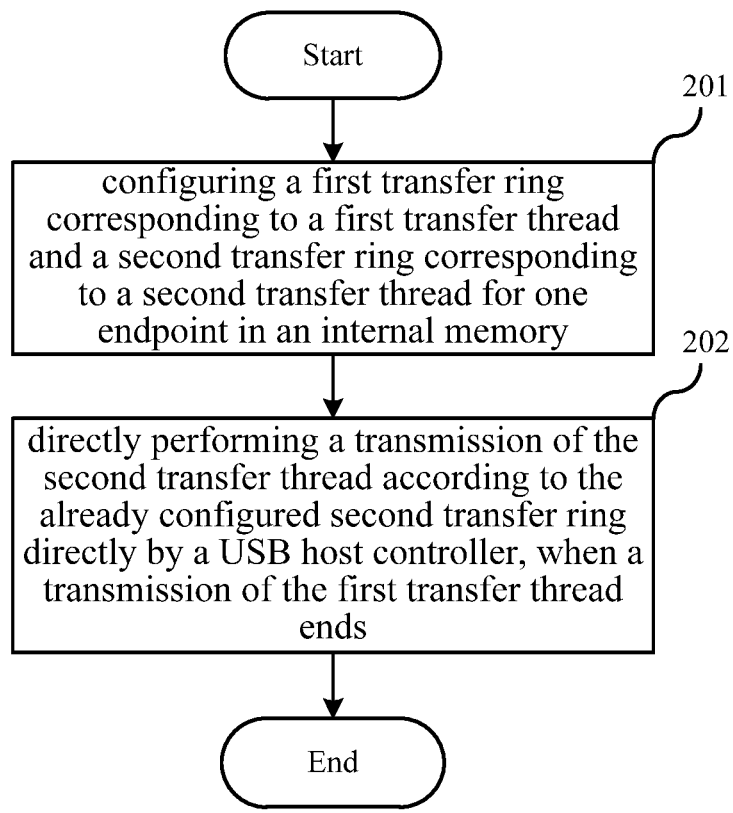
FIG. 2 is a schematic flow chart of a USB transmission method according to a second embodiment of the present application.

A second embodiment of the present application relates to a USB transmission method, and the flow thereof is as shown in FIG. 2, and the method includes:

In step 201, configuring a first transfer ring corresponding to a first transfer thread and a second transfer ring corresponding to a second transfer thread for one endpoint in a memory;

In step 202, directly performing a transmission of the second transfer thread according to the already configured second transfer ring by a USB host controller, when a transmission of the first transfer thread ends.

Since one endpoint is configured with two transfer threads, there are corresponding changes in the way the host handles various commands. These changes are described in the following embodiments.

In the following embodiments, configure endpoint command, set TR dequeue pointer command, stop endpoint command, and transfer command are all existing commands in the USB protocol. The improvement in the embodiments of the present application is mainly in the way in which these commands are executed, and information in some commands (such as configure endpoint command, etc.) will be improved. The portions not mentioned in the following embodiments, such as source of the commands, etc., are implemented in the same manner as the existing protocols, and will not be described in detail in the present application.

In one embodiment, the configure endpoint command includes initial dequeue pointers of the first and second transfer ring; when the host controller executes the configure endpoint command, the initial dequeue pointers of the first transfer ring and the second transfer ring in the configure endpoint command are copied into the device context.

In one embodiment, setting a transfer loop dequeue pointer of the first transfer thread or the second transfer thread selectively when the host controller executes a set TR dequeue pointer command.

In one embodiment, stopping all threads simultaneously that the endpoint is executing and storing the transfer loop dequeue pointers of all currently executing threads when the host controller executes a set stop endpoint command.

In one embodiment, resuming execution of all threads that are currently stopped when the host controller executes a transfer command.

In one embodiment, stopping all threads of the endpoint when the endpoint has a transmission error and needs to be stopped.

In an embodiment, the method further includes:

storing a pipe identifier of a transfer request to a periodic request buffer if the transfer request initiated by a software is periodic, otherwise to a software request buffer;

storing the pipe identifier of the transfer request to a saved request buffer, if the transfer request has been interrupted by missing a current service opportunity and needs to wait for a next service opportunity to resume;

storing the pipe identifier of the transfer request to a not-ready request buffer, if the transfer request is interrupted due to a not-ready handshake signal returned from a USB device;

selecting a transfer request for transmission from the software request buffer, the periodic request buffer, the saved request buffer, and the not-ready request buffer;

loading information for the selected transfer request from a pipe information buffer;

determining whether to write pipe information back to the pipe information buffer according to current transmission state during the transmission or after end of the transmission;

wherein the pipe information buffer is configured to buffer information about transfer requests corresponding to N pipes, where N is a positive integer.

In order to be able to better understand the technical solutions of the present application, the following detailed description is made in conjunction with a specific example. The details of the examples are mainly for the purpose of understanding and not limiting the scope of the application.

A USB host needs to support up to 127 USB devices at the same time. Each USB device (hereafter also referred to device) can support up to 31 endpoints. In reality applications, it is basically impossible for each endpoint of 127 devices to be transmitted at the same time (the simultaneous transfer threads can reach 127×31=3937), if enough resources are configured for each endpoint to allow 3937 threads to be transmitted at the same time, it will cause a great waste of resources, so only a limited number of endpoints to transmit at the same time are need to support. If the resources are exhausted in extreme conditions, the software can queue up to wait for the transmission of the previous endpoint to be completed, and then submit the pending transfer requests.

Therefore, this application describes how to perform scheduling management of USB pipe under limited resources. including how to switch to the next pipe when the service opportunity of the current pipe is used up, and how to save breakpoint information and to resume the transmission when a pipe hangs due to a transmission error or receiving a device not-ready handshake or a stop command.

Under the current XHCI protocol, an endpoint of a USB host can only respond to a transfer command, and then read data on the transfer ring for transmission. Only after the current transmission is completed can the next transfer command be responded to. The present application enables the USB host to simultaneously respond to two transfer requests of the same endpoint, that is, one endpoint may have two transfer threads at the same time.

Figure 3:
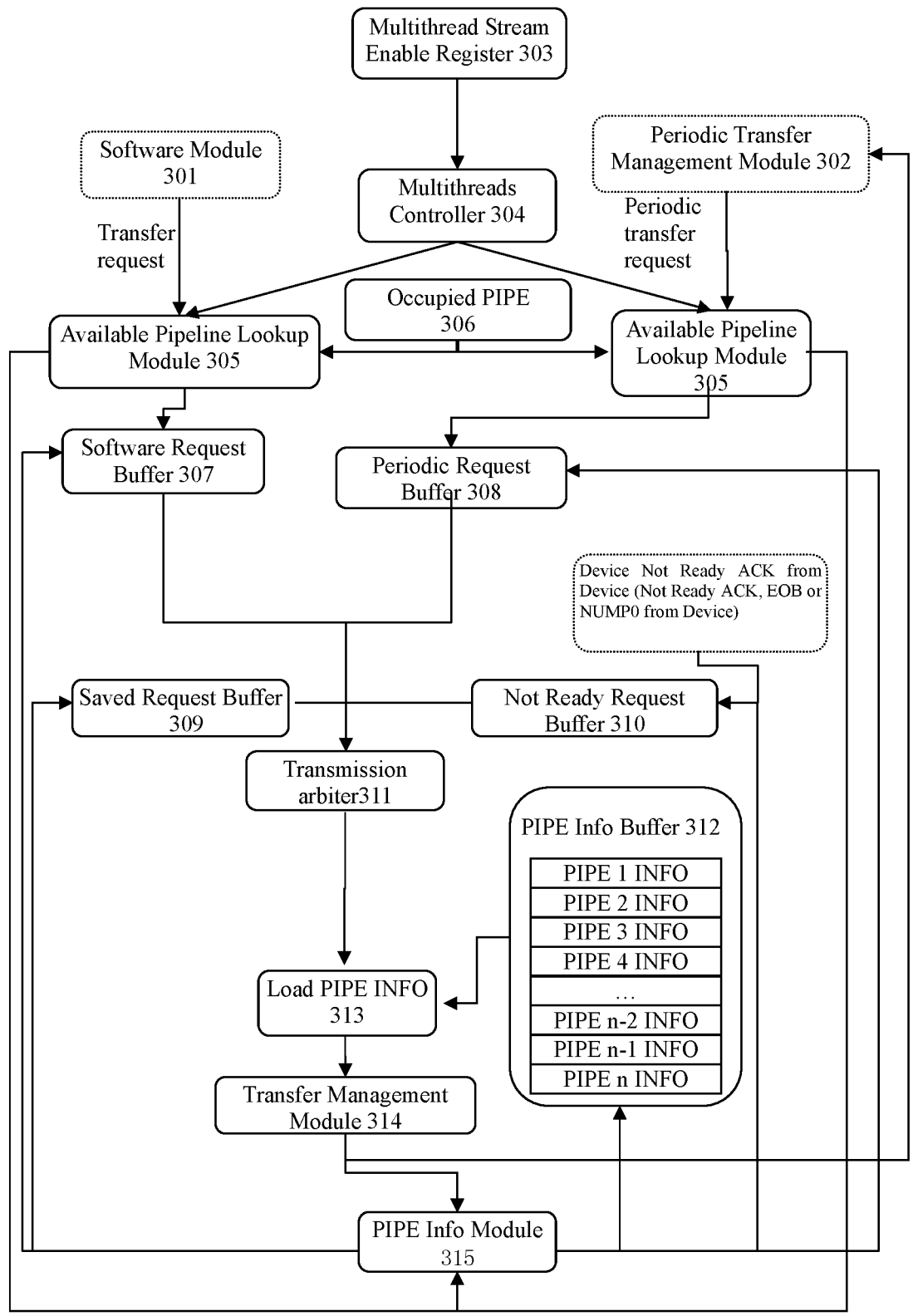
FIG. 3 is a block diagram of a pipe management according to an embodiment of the present application.

Now suppose that a USB host that can accept n transfer requests at the same time is designed, wherein n is a positive integer and can be set according to the requirements of the SoC of the USB host. Note that accepting a transfer request does not mean that transmission can be made immediately, but simply writing the pipe information into a pipe info buffer. After having a free thread, the information is read out from the pipe info buffer for performing the transmission. The number of threads that can be transmitted at the same time may also be set according to the requirements of the system. FIG. 3 is a block diagram of pipe management.

Modules related to pipe management include:

a system software module 301, consisting of XHCI host driver, device driver and USB application;

a periodic transfer management module 302, configured to manage both synchronization (Isoch) and interruption (Interrupt) of two kinds of periodic transmissions; after the software requests a periodic transmission from the endpoint of a device, the request initiated by the software is stored to the module; the module periodically initiates a transfer request according to the characteristics of the endpoint of the device until the transmission of data requested by the software is completed, then the periodic transfer request is deleted from this module;

a multithread stream enable register 303, which is a control register in the USB 3.x host hardware that can be configured to enable multi-threading of the host;

a multithread controller 304, configured to determine whether to initiate multi-threaded transmission;

an available pipe lookup module 305, configured to find out if there are available pipe resources to accept the current transfer request;

an occupied pipe module 306 (Occupied pipe), which is a set of registers, configured to save pipe code numbers (pipe ID) that have been used; for example, if a host supports 32 pipes, the code numbers are PIPE 1, PIPE 2 . . . . . , PIPE 32, then this register may be a 32-bit length register and numbered from 1 to 32, if a pipe is occupied, its corresponding bit is set to 1, if a pipe is released, the corresponding bit is set to 0; for example, if pipe 3 is occupied, then the 3rd bit of this register is set to 1, if pipe 3 is released, the 3rd bit is set to 0; if 32 bits are all set, it means that the pipes are all busy, and cannot accept new transfer requests until at least one of the pipe resources is released;

a software request buffer 307 (SW Req Buffer), which is a set of registers that save pipe code numbers of the transfer requests initiated by the software;

a periodic request buffer 308 (Periodic Req Buffer), which is a set of registers that save periodic transfer requests;

a saved request buffer 309 (Saved Req Buffer), which is a set of registers that save the transfer requests that have been interrupted for some reason and need to be resumed in the future;

a not-ready request buffer 310 (Not Ready Req Buffer), which is a set of registers that save the transmission that has been interrupted due to the USB device returning a NRDY (Not Ready) handshake, and resume the transmission when receiving ERDY (Endpoint Ready) at the next time.

The software request buffer 307, the periodic request buffer 308, the saved request buffer 309, and the not-ready request buffer 310 are four register sets, each register for a buffer can be set to 0 or 1, and if set to 1, the pipe corresponding to this register has a reason corresponding to the buffer, if set to 0, the corresponding pipe does not have a corresponding reason. For example, if the fifth register of not-ready request buffer is set to 1, it indicates that the request for PIPE 5 is a not-ready request. If the second register of the periodic request buffer is set to 1, it indicates that the request for PIPE 2 is a periodic request. The present application is not limited thereto, for example, the code numbers may be PIPE 0, PIPE 1 . . . . , PIPE 31, and the register may be numbered from 0 to 31.

Modules related to pipe management further include a transmission arbiter, a pipe information buffer, a pipe information load module, a transfer management module and a pipe information module.

The transmission arbiter 311 (Arbiter) selects one transfer requests in the software request buffer 307, the periodic request buffer 308, the saved request buffer 309, and the not-ready request buffer 310 for transmission.

The pipe information buffer 312 (PIPE Info Buffer) stores various information of each transfer request, such as ID of a streaming transmission, stage of control transfer, dequeue pointers of the transfer request blocks (TRBs) of transfer rings, offset address of the transfer storage address corresponding to the current transfer request block (when the endpoint continues to transmit, it needs to transmit from the end of the last transmission, so it is necessary to record the length of the data that has been successfully transmitted last time, that is, the offset address), and so on.

The pipe information load module 313 (Load PIPE INFO) reads information of the transfer request selected by the arbiter from the pipe information buffer. In particular, after selecting a transfer request, the arbiter transmits the selected pipe ID to the pipe information load module, and the pipe information load module reads the corresponding pipe information from the pipe information buffer according to the pipe ID.

The transfer management module 314 is responsible for specific transfer ring management and data transmission.

The transfer management module 314 is further configured to transmit various state information of the current pipe to the pipe information module during the transmission or after the end of the transmission, and the pipe information module 315 (PIPE Info Module) determines whether to write the pipe information back to the pipe information buffer according to the current transmission state.

Using the above system for USB3.x pipe classification management, it is easy to manage the resuming of transmission from breakpoint and control the priority of transmission. According to the source of the transmission, pipe is divided into four categories:

1) SW_REQ: the asynchronous transmission initiated by system software (save to the software request buffer 307);
2) PO_REQ: the periodic transmission initiated by the periodic transfer management module (saved to the periodic request buffer 308);
3) RD_REQ: the transmission initiated after receiving Ready handshake from the USB device (saved in the not-ready request buffer 310);
4) SO_REQ: the transmission that is suspended by missing the current service opportunity and initiated when the next service opportunity arrives (saved in the saved request buffer 309);

All original transfer requests are initiated by the system software.

If the transfer request initiated by the system software is a periodic transmission, then the transmission is transmitted by the transfer management module 314 to the periodic transfer management module 302 and saved therein, and the periodic transfer management module 302 calculates, according to the information related to the pipe, when to initiate a transfer request to the USB device.

If the current transmission is suspended due to the USB device is not ready, a request to resume transmission is initiated after receiving the Ready handshake from the USB device.

If the current transmission is suspended due to loss of the service opportunity, the transmission will be resumed automatically at the next service opportunity.

Rules for pipe to enter pipe buffer: in order to implement the first-come-first-execution of the same type of pipe, the ID of each entered pipe is recorded in the pipe buffer. If there is a current pipe needs to enter the pipe buffer, the ID of the current pipe needs to be written in a free space after the space of the last pipe ID. If the address of last pipe ID has reached the maximum, the next pipe ID will be written into the first space of pipe buffer.

The rule of pipe execution: if the ID of the currently executed pipe is X, when the current pipe is executed, the value of X is incremented by 1, which points to the ID of the pipe to be executed. That is, X is the ID of the pipe that needs to be executed, when the X value reaches the maximum value, it returns to the first pipe, i.e., X is equal to 1.

The embodiment of the invention also implements multi-thread transmission for an endpoint of USB host, and the multi-thread refers to the execution of two transfer threads for the same endpoint. Between different endpoints, as long as there are transmission resources, they can transmit at the same time. One endpoint shares thread resources of the USB host controller with different endpoint. For example, the USB host is configured to support 4 threads. If three threads have been occupied by some endpoints, only one thread can be utilized by the other endpoint, and when all four threads are occupied, other transfer requests can only be transmitted after one of the threads is completed and its resource is released.

For an endpoint, if there are two threads in the USB host controller at the same time, they will share some common information of the USB device (including all information of the Slot Context in the XHCI protocol and all information except the dequeue pointers of TRBs of transfer rings in the Endpoint Context). Adding a dequeue pointer of a TRB of a transfer ring in the endpoint context for the second thread to use.

The operations for achieving multi-thread include:
a) initializing two transfer rings in memory for an endpoint which supports the second thread;
b) adding support for a second thread in the configure endpoint command, that is, writing initial dequeue pointers of TRBs of transfer rings of the first and second threads into the input context; when host executes the configure endpoint command, the initial dequeue pointers are copied into the output device context; when the host controller executes the transfer command, transfer rings can be selected according to the thread code and the dequeue pointer in the device context for that thread.
c) adding support for the second thread in the Set TR Dequeue Pointer command; when host executes Set TR Dequeue Pointer command, the dequeue pointer of the TRB of the transfer ring of the first thread or the second thread can be set selectively.

d) implementing multi-thread transmission through the upper layer protocol, such as defining a thread data structure through upper layer data structure, in this case, when implementing multi-thread transmission, the host and the device are not necessary to consider which thread the current data belongs to.

Accordingly, the operations performed by the USB host controller include:

a) stopping all threads of the target endpoint at the same time, and saving the dequeue pointers of TRBs of transfer rings of all currently executing threads, when the stop endpoint command is executed;

b) sending a Header Packet containing thread information to the device, so that the device knows which thread the current transmission belongs to; for devices that support multi-threading, two threads can send data at the same time; for devices that do not support multi-threading, the host needs to transfer the next thread after the current thread ends; since the transmission loop of the next thread has already been configured, the host has already prepared various information and buffers for the transmission of the thread, so it can directly perform the data transmission without waiting for the process of configuring the transfer ring;

c) when receiving a transfer command from the application software, if there is a suspended/stopped thread, then the suspended/stopped thread is executed;

if there are two suspended/stopped threads, then both of them are executed;

d) when the endpoint has a transmission error and is halted/stopped, all threads of this endpoint are halted/stopped; transmission errors include errors that may cause a transmission interruption during all transmissions, such as a serial number error or transfer retry times exceeding the limit number occurred during date transmission between a tread and the device.

Accordingly, the operations performed by the USB device include:

a) adding a description of whether multi-thread is supported in a device descriptor;

b) if the device supports multi-threading, then it is necessary to distinguish from the header packet which thread the current transmitted data belongs to; if the device does not support multi-threading, the host controls the order of the data streams without distinguishing which thread the currently transmitted data belongs to.

In one embodiment, the associated logic is designed into the USB 3.x host controller IP and then integrated into the SoC chip, and it is implemented together with the USB3.x host controller while programming system drivers and application software.

Embodiments of the present application also provide a computer storage medium in which computer executable commands are stored, wherein the computer executable commands are executed by a processor to implement various method embodiments of the present application.

It should be noted that in the application documents of the present patent, relational terms such as first and second, etc. are only configured to distinguish one entity or operation from another entity or operation, and do not necessarily require or imply any such actual relationship or order between these entities or operations. Furthermore, the term "comprises" or "comprising" or "includes" or any other variations thereof is intended to encompass a non-exclusive inclusion, such that a process, method, article, or device that comprises a plurality of elements includes not only those elements but also Other elements, or elements that are inherent to such a process, method, item, or device. An element that is defined by the phrase "comprising a" does not exclude the presence of the same element in the process, method, item, or device that comprises the element. In the application file of this patent, if it is mentioned that an action is performed according to an element, it means the meaning of performing the action at least according to the element, and includes two cases: the behavior is performed only on the basis of the element, and the behavior is performed based on the element and other elements. Multiple, repeatedly, various, etc. expressions include 2, twice, 2 types, and 2 or more, twice or more, and 2 types or more types.

All documents referred to in this application are considered to be included in the disclosure of the present application as a whole, so as to serve as a basis for modification as necessary. In addition, it should be understood that various changes and modifications may be made by those skilled in the art after reading the above disclosure of the present application.

The invention claimed is:

1. A universal serial bus (USB) transmission device comprising:
    a configuration module configured to configure a first transfer ring corresponding to a first transfer thread and a second transfer ring corresponding to a second transfer thread for one endpoint in a memory;
    a USB host controller configured to directly perform a transmission of the second transfer thread according to the configured second transfer ring when a transmission of the first transfer thread ends;
    a software request buffer configured to store pipe identifiers of transfer requests initiated by software;
    a periodic request buffer configured to store pipe identifiers of periodic transfer requests;
    a saved request buffer configured to store pipe identifiers of transfer requests interrupted by missing a current service opportunity and waiting for a next service opportunity to resume;
    a not-ready request buffer configured to store pipe identifiers of transfer requests interrupted due to a not-ready handshake signal returned from a USB device;
    an arbiter configured to arbitrate in transfers and select a transfer request from transfer requests in the software request buffer, the periodic request buffer, the saved request buffer, and the not-ready request buffer for transmission; and
    a transfer management module configured to manage a data transmission process of the transfer request selected by the arbiter.

2. The USB transmission device according to claim 1, wherein:
    initial dequeue pointers of the first transfer ring and the second transfer ring are included in a configure endpoint command; and
    the initial dequeue pointers of the first and second transfer rings in the configure endpoint command are copied into USB device context when the USB host controller executes the configure endpoint command.

3. The USB transmission device according to claim claim 1, further comprising:
    a pipe information buffer configured to buffer information about transfer requests corresponding to N pipes, wherein N is a positive integer; and a pipe information load module configured to load information of a selected transfer request from the pipe information buffer with respect to a transfer request selected by the arbiter.

4. The USB transmission device according to claim 3, wherein the software request buffer, the periodic request buffer, the saved request buffer, and the not-ready request buffer respectively include N registers each corresponding to one transfer request in the pipe information buffer.

5. The USB transmission device according to claim 4, further comprising a pipe information module, wherein:
the transfer management module is further configured to transmit various state information of a current pipe to the pipe information module during the transmission process or after the end of the transmission, and
the pipe information module determines whether to write pipe information back to the pipe information buffer according to current transmission state.

6. The USB transmission device according to claim 5, further comprising a periodic transfer management module configured to manage synchronization and interruption of two periodic transmissions,
wherein the periodic transfer management module stores a request initiated by the software and periodically initiates a transfer request according to characteristics of the endpoint after the software requests a periodic transmission from the endpoint.

7. A universal serial bus (USB) transmission method comprising:
configuring a first transfer ring corresponding to a first transfer thread and a second transfer ring corresponding to a second transfer thread for one endpoint in a memory;
directly performing a transmission of the second transfer thread according to the configured second transfer ring by a USB host controller, when a transmission of the first transfer thread ends;
storing a pipe identifier of a transfer request into a periodic request buffer when the transfer request initiated by a software is periodic, and when the transfer request initiated by the software is not periodic, storing into a software request buffer;
storing the pipe identifier of the transfer request into a saved request buffer, when the transfer request has been interrupted by missing a current service opportunity and waits for a next service opportunity to resume;
storing the pipe identifier of the transfer request into a not-ready request buffer, when the transfer request is interrupted due to a not-ready handshake signal returned from a USB device; and selecting a transfer request for transmission from the software request buffer, the periodic request buffer, the saved request buffer, or the not-ready request buffer.

8. The USB transmission method according to claim 7, further comprising:
copying initial dequeue pointers of the first transfer ring and the second transfer ring in the configure endpoint command into USB device context when the host controller executes the configure endpoint command,
wherein the initial dequeue pointers of the first transfer ring and the second transfer ring are included in a configure endpoint command.

9. The USB transmission method according to claim 7, further comprising setting a transfer loop dequeue pointer of the first transfer thread or the second transfer thread selectively when the host controller executes a set transfer ring dequeue pointer command.

10. The USB transmission method according to claim 7, claim 9, further comprising:
stopping simultaneously all threads which the endpoint is executing; and
storing the transfer loop dequeue pointers of all currently executing threads when the host controller executes a set stop endpoint command.

11. The USB transmission method according to claim 7, further comprising resuming execution of all threads that are currently stopped when the host controller executes a transfer command.

12. The USB transmission method according to claim 7, further comprising stopping all threads of the endpoint when the endpoint has a transmission error and needs to be stopped.

13. The USB transmission method according to claim 7, further comprising, after the step of selecting a transfer request:
loading information for the selected transfer request from a pipe information buffer; and
determining whether to write pipe information back to the pipe information buffer according to current transmission state during the transmission or after the end of the transmission,
wherein the pipe information buffer is configured to buffer information about transfer requests corresponding to N pipes, wherein N is a positive integer.

14. A non-transitory computer readable storage medium storing computer executable commands, the computer executable commands being executed by a processor to implement the steps in the method according to claim 7.

* * * * *